United States Patent Office 2,976,107
Patented Mar. 21, 1961

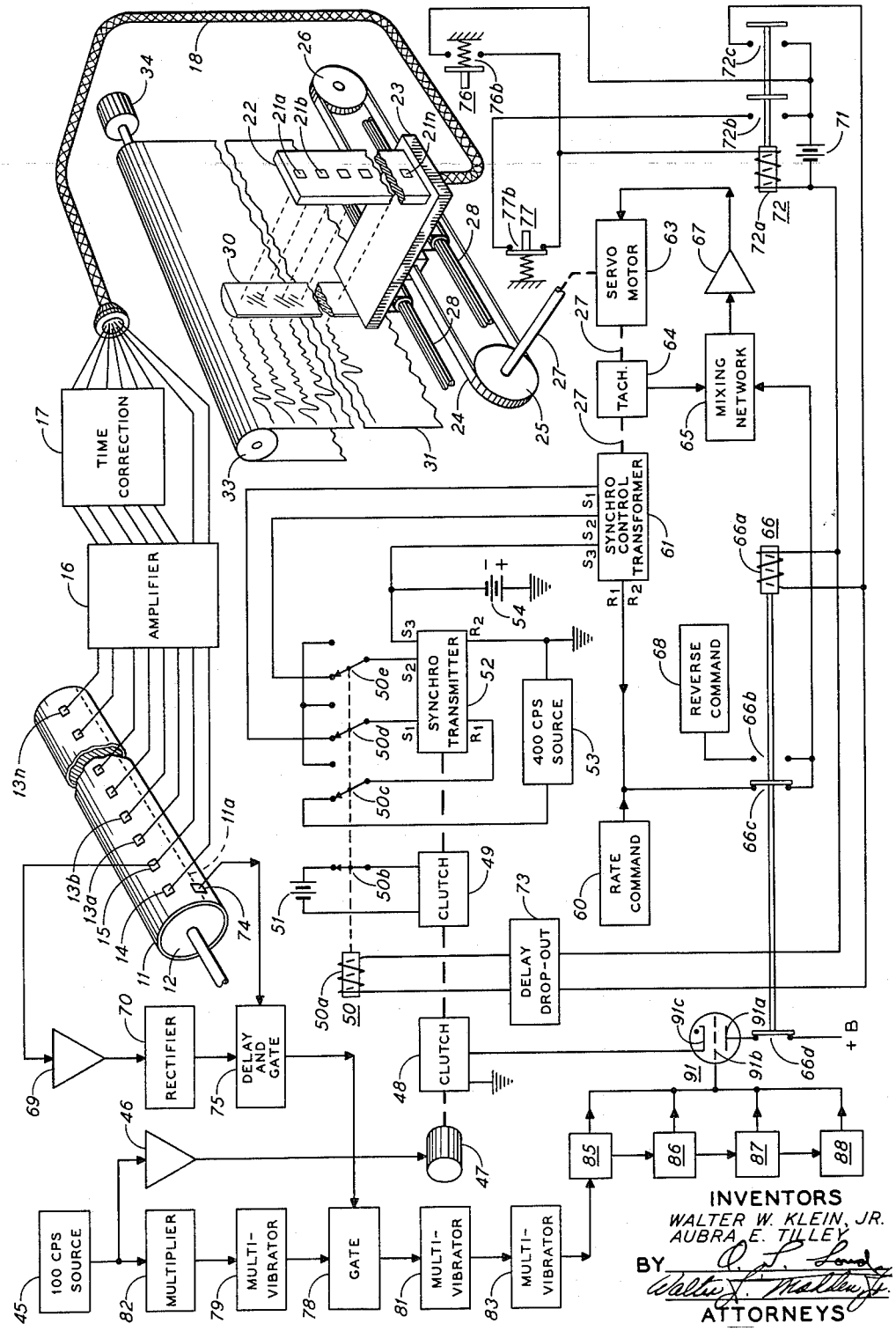

2,976,107

SEISMIC SECTION PLOTTER

Walter W. Klein, Jr., and Aubra E. Tilley, Fullerton, Calif., assignors to California Research Corporation, San Francisco, Calif., a corporation of Delaware Filed Apr. 3, 1957, Ser. No. 650,457

5 Claims. (Cl. 346—109)

This invention relates in general to seismic prospecting and relates more particularly to methods and apparatus for plotting or presenting the data obtained in such prospecting.

In seismic prospecting a series of seismic disturbances are created and the resulting earth movement from these disturbances is detected at a plurality of detector stations where the movement is converted into corresponding electrical signals which are recorded in some manner for subsequent analysis. It is conventional in such prospecting to progressively move the seismic wave detector spread and shot point across the area to be prospected, usually with overlapping coverage between shots, so that a profile of the surveyed area results. It is customary to obtain a plurality of detector signals for each disturbance, usually 24 traces or signals, and to record these traces on a suitable recording medium. Such medium may be a reproducible recording medium, such as a magnetic recorder, on which the signals are recorded and from which they may be reproduced repeatedly and at will. Generally, the recording capacity of the field recording medium is limited so that only 24 or 48 traces may be recorded thereon at a time, after which the recording medium is changed, such as by removing the magnetic tape or belt and replacing it. The records are then taken back to a field office for presentation and analysis.

One of the most useful forms of presenting seismic data is the seismic section in which all of the seismic traces are corrected for time variations and presented in side by side relationship on a large cross-section sheet. Such presensation permits the viewing of the section as a whole so that subtle trends in the section, which might not be apparent in viewing merely a single record, are made more evident. Heretofore, however, such presentations were difficult and expensive to produce, since in the case of photographic records, the appropriate corrections had to be made on the different records and then the records pasted together or otherwise aligned on a cross-section sheet in the desired relationship. Similarly, with reproducible records, the records had to be reproduced from the reproducible recording medium and applied to a photographic medium to produce a photographic record which was then optically transferred to the cross-section sheet.

Broadly, the present invention contemplates methods and apparatus for automatically plotting or presenting a plurality of seismic traces in cross-section form. The present invention is particularly adapted for use with reproducibly recorded seismic records which, in accordance with the present invention, are reproduced and supplied to the plotting mechanism of the present invention to directly produce the desired cross-section. In accordance with the present invention, the individual signals from a given reproducible record are supplied to an optical recording system, such as a galvanometer bank which is movable relative to a sheet of photographic paper. The different signals from the record are supplied to the different galvanometers as the galvanometers move relative to the paper so that a plurality of individual traces are produced directly on the photographic paper for each sweep of the plotting mechanism.

After plotting a given record, the plotting mechanism automatically returns to its starting position, and the cross-section paper is automatically advanced a predetermined amount to expose a new area of the paper adjacent the previously plotted traces for the next sweep of the plotting mechanism. The operation thus continues to automatically plot a plurality of individual seismic traces on each sweep of the carriage mechanism to produce on the cross-section paper a resultant seismic cross-section in which the traces are presented in side by side relationship corresponding to a profile or cross-section of the surveyed area. The various intrarecord time corrections between individual traces, such as normal moveout correction, may be made in the individual signals at any suitable time, such as at the time of recording, or after reproduction from the reproducible recording medium and prior to supplying these traces to the plotting mechanism, so that the traces as plotted are time corrected to the extent desired and the resulting seismic cross-section represents an accurate picture of the surveyed area. Static time corrections in the traces, such as weathering and elevation corrections, may be made by means of a "datum shift" control in the plotter to be described more in detail below.

In order for the plotted cross-section to correspond in time to the signals as recorded on the recording medium, it is apparent that there must be an accurate correlation between the timing on the reproducible record and on the cross-section plotter. The timing reference on the reproducible record is usually in the form of a constant frequency signal which can be converted into a series of corresponding timing lines or marks on the photographic records. To this end, the present invention utilizes a timing signal related to the timing signal on the reproducible record to control the drive of the plotting mechanism through a servo network so that the signals as plotted on the section correspond in real time to the reproducibly recorded signals.

The relation between the control timing signal and the timing on the reproducible record may be established in any suitable manner, such as through the use of a timing source capable of generating a signal of the same frequency as the timing signal on the reproducible record. In one such case, this timing source is utilized to control the drive of the reproducible recording medium on playback and to control the plotting carriage drive, so that the timing of the carriage drive corresponds as closely as possible to the original timing on the reproducible record. Similarly, other suitable systems may be utilized to establish the desired relationship, the important point being that the timing on the carriage drive is correlated as closely as possible with the timing on the reproducible record.

Additionally, it is apparent that the start of the plotting carriage motion must be accurately correlated with the rotation of the reproducible recording medium and the signals recorded thereon so that the carriage commences plotting simultaneously with the start of the seismic signals. To accomplish this, the present invention utilizes a reference timing event, preferably the time break on the seismic record, to control the start of the carriage motion. Further, the present invention provides for varying the time of start of the carriage motion relative to the seismic signals, by means of a "datum shift" control, by which the time of carriage start may be either advanced or retarded with respect to a zero datum shift corresponding to the start of the seismic detector signals on the reproducible recording medium. Such datum shift permits plotting of sections to data planes other than the conventional zero data plane below the weathered layer, and permits shifting the position of successive plotting sweeps, one with respect to the other, to enter static time shifts to correct for variations in weathering and elevation.

Objects and advantages of the present invention will be apparent from the following description when read in connection with the accompanying drawing, the single figure of which diagrammatically and schematically illustrates one embodiment of the present invention.

Referring to the drawing by character of reference, numeral 11 designates a reproducible recording medium on which the seismic signals are recorded and from which the signals to be plotted are reproduced. Recording medium 11 may be in the form of a magnetizable element disposed about the periphery of a rotor, or may be, as shown, a magnetic belt which is mounted on a rotor 12 for rotation relative to a plurality of recording and/or reproducing heads 13a, 13b . . . 13n. Recording medium 11 may be placed on a field recorder for the recording of the seismic signals in the field and then removed therefrom for mounting on a reproducer for reproduction into the plotting apparatus of the present invention. In such a case, recording medium 11 will have a joint or suture 11a along the edge where the two ends of the belt meet and this suture will be utilized for a purpose to be described more in detail below.

The reproducible record is also provided with a timing channel, represented by head 14, on which the timing signal is recorded, and a time break channel, represented by head 15, on which the time break or instant of creation of the seismic disturbance is recorded. The signals reproduced from recording medium 11 are supplied through an amplifier 16 to a time correction network 17 where different intrarecord time corrections, such as normal moveout, may be applied to the reproduced signals. Alternatively, as is well known in the art, the normal moveout correction may be applied at the time of recording the signals on or reproducing the signals from medium 11, by suitable movement of the recording/reproducing heads during the recording or reproduction.

The time corrected signals from network 17 are supplied through a cable 18, along with the timing and time break signals, to the recording elements of the plotting mechanism of the present invention. The recording mechanism may be of any suitable type such as a cathode ray tube, or, as shown, a bank of galvanometers 21a through 21n. Galvanometers 21 may be of the conventional moving coil type, as is well known in the art, and are mounted in a housing 22 which is in turn secured to a carriage member 23. Carriage 23 and the associated galvanometers are driven by a belt 24 which is mounted over pulleys 25 and 26. Pulley 25 is driven through a shaft 27 in a manner to be described in more detail below. The movement of carriage 23 is guided by a pair of cylindrical guide members 28 mounted on either side of belt 24. Carriage 23 moves past a sheet of recording paper 31, such as photographic paper, on which the seismic traces are to be plotted. The beams of light from galvanometers 21 are focused on paper 31 by means of a suitable lens system 30. Recording paper 31 is fed from a magazine and is wound over a reel 33 by a take-up motor 34 into a take-up magazine from which the exposed paper may be removed for developing. It will be understood that the galvanometers and photographic paper will be disposed in a suitable light-tight enclosure.

In order to produce an exact correlation between the traces plotted on paper 31 by moving galvanometers 21 and the traces from recording medium 11, it is necessary that the timing of the carriage drive for the plotter be synchronized with the timing on the recorder/reproducer. To accomplish this, a timing signal related to the timing signal from the timing channel represented by reproduce head 14 is used as a reference for the carriage drive, so that the time in which the signals are plotted on paper 31 corresponds to the time in which the signals are recorded on and reproduced from device 11. This timing signal, which is preferably a 100 cycle per second signal, may be supplied from a suitable source 45 through an amplifier 46 to a synchronous motor 47. Synchronous motor 47 will run at a speed determined by the frequency of the electrical signal supplied thereto, so that the speed of rotation of motor 47 corresponds to the frequency of the timing signal from source 45.

Motor 47 is mechanically connected through a pair of clutches 48 and 49 to a servo transmitter 52, so that servo transmitter 52 generates an electrical signal whose amplitude and phase is a measure of the speed and position of synchronous motor 47 and hence, a measure of the desired speed and position of the plotter carriage. Clutch 49 is connected through the contact arm and contacts 50b of a relay 50 to a suitable supply of energization current such as a battery 51. Relay 50 also has an energization coil 50a and three additional contact arms and associated sets of contacts 50c, 50d and 50e. Contacts 50c, 50d and 50e are associated with servo transmitter 52 which may be of any suitable type, such as one having a stator winding represented by conductors S1, S2 and S3, and a rotor winding represented by conductors R1 and R2. With the connections shown in the drawing, contacts 50c connect the rotor of device 52 to a suitable source of current 53, while contacts 50d and 50e connect the stator winding to the stator winding of a synchro control transformer 61. When contacts 50c, 50d and 50e are in the position opposite to that shown in the drawing, the stator and rotor windings of device 52 are connected to a battery 54 for a purpose to be described more fully below.

Synchro control transformer 61 is mechanically connected through shaft 27 to a servo motor 63 which drives shaft 27, pulley 25 and belt 24 to drive the plotter carriage. Synchro control transformer 61 is provided with a rotor winding, represented by conductors R1 and R2, across which will appear the error signal representing the difference between the desired speed and position of the plotter carriage and the actual speed and position of the carriage. The error signal from the rotor of device 61 is supplied through the "forward" contacts 66c of a relay 66 to a mixing network 65. Mixing network 65 also has supplied thereto a signal from a rate command generator 60 and a signal from a tachometer generator 64 which is driven by shaft 27 and servo motor 63. The output from mixing network 65 is supplied through a servo amplifier 67 to servo motor 63.

Relay 66 is also provided with an energizing coil 66a, a pair of "reverse" contacts 66b and an additional set of contacts 66d. When reverse contacts 66b are closed, servo amplifier 67 is connected therethrough to a reverse command generator 68 which supplies a reverse signal to servo motor 63 to return the carriage to its starting position. Energizing coil 66a is connected to a suitable source of current, such as a battery 71, through the contacts 72c of a relay 72 having an energizing coil 72a and a set of sealing-in contacts 72b.

Closure of contacts 72c also energizes coil 50a of relay 50 through a delay drop-out network 73, so that upon closure of contacts 72c, coil 50a is energized for a period of time determined by the delay constant of network 73 and is then de-energized. Coil 72a is connected to battery 71 through its sealing-in contacts 72b when closed and through contacts 76b of a limit switch 76 which is operated by carriage 23 at the end of its forward plotting movement. An additional set of limit switch contacts 77b of a limit switch 77 are actuated by carriage 23 at the end of its reverse cycle of operation to break the circuit to coil 72a through sealing-in contact 72b.

In order to control the start of the carriage motion to begin the plotting operation, a reference timing event from the seismic record is utilized and preferably this reference event is the time break, which indicates the instant of detonation of the explosive. This time break appears as a pulse on time break channel 15. The time break signal from channel 15 is supplied through an amplifier 69 and a full-wave rectifier 70 to a delay and gate network 75. Delay and gate network 75 is only energized for a predetermined time interval starting at a predetermined time after the suture 11a passes under a suitable reference device such as a micro-switch 74. Since the occurrence of the time break can be predicted within a certain interval, starting at a predetermined time after suture, the delay in network 75 is adjusted so that the gating network is open only for this predetermined interval at a predetermined time after suture. This eliminates the triggering of the carriage drive by pulses in the time break channel other than the time break itself.

The time break pulse gated through network 75 triggers an additional gating network 78 which is connected between a pair of multivibrators 79 and 81. Multivibrator 79 is connected to a multiplier 82 which multiplies the 100 cycle per second signal from source 45 to produce a 4000 cycle per second sine wave. This sine wave from multiplier 82 is converted by multivibrator 79 into a corresponding square wave. When gate 78 is triggered, this square wave from multivibrator 79 passes sequentially through multivibrator 81 and an additional multivibrator 83 which each frequency divide the incoming signal by 2, so that in the case of a 4000 cycle per second signal from multiplier 82, the output from multivibrator 83 is a 1000 cycle per second square wave which is used to control the time of the start of the carriage motion. A frequency of 1000 cycles per second is preferably used since it may be conventionally converted to milliseconds, the conventional timing unit for seismic records.

The output from multivibrator 83 is supplied to a group of parallel-connected preset counters 85, 86, 87 and 88 which count, respectively, milliseconds, tens of milliseconds, hundreds of milliseconds and seconds. Counters 85—88 are adjustable so that the "datum shift" count to which the counters are set may be varied and so that upon reaching the predetermined count, a pulse is supplied from the parallel-connected outputs of the counters. This pulse is supplied to the grid 91b of a suitable control device such as a gas-filled tube 91 having an anode 91a and a cathode 91c. Anode 91a is connected to suitable B+ supply of plate voltage through contacts 66d of relay 66, and cathode 91c is connected to the energization mechanism of clutch 48 so that the appearance of a positive pulse on grid 91b causes conduction of tube 91 to supply current to energize clutch 48.

The operation of the embodiment illustrated in Fig. 1 is as follows: Assume that the seismic signals have been recorded on medium 11 and that medium 11 is now in position to have the signals thereon reproduced. Since it was mentioned above that the time break on the record is to be utilized as a reference event, and since the signal to start the carriage drive must be given a short time before actual plotting is to begin in order to permit the carriage to come up to speed for the start of the plotting operation, it is apparent that the reproducer must make one revolution from which the time break occurrence can be measured and a second revolution during which the signals can be reproduced and the plotting operation carried out. Therefore, assuming that recording medium 11 is rotating, when suture 11a passes under micro-switch 74, the delay in gate network 75 is energized. At a predetermined time after this energization, the gate in network 75 is energized for a predetermined time interval during which the time break will occur. Thus, when the time break pulse is picked up by time break head 15, it is supplied through amplifier 69 and full wave rectifier 70 and gated through network 75 to trigger gate 78. Upon triggering of gate 78, the signal from multivibrator 79 is supplied through multivibrators 81 and 83 to produce a 1000 cycle per second pulse train to preset counters 85—88.

Counters 85—88 have been preset in advance in accordance with the "datum shift" desired in the plotting. Where it is desired to start the plotting at the same time as the start of the seismic signals, the "datum shift" is zero and the carriage starts its movement ahead of the actual plotting only by the time interval required for the carriage to come up to speed. On the other hand, there may be instances where it is desired to start the carriage either before or after the zero datum shift point, such as in the case where it is desired to plot to a reference datum other than the conventional bottom of the weathered layer, and in this case, the carriage start may be shifted a corresponding amount by variations in the setting of counters 85—88.

Regardless of what datum shift is used, when counters 85—88 reach the count corresponding to the desired datum shift, a pulse is supplied to the grid of tube 91 to render this tube conductive for supplying current to clutch 48. Energization of clutch 48 mechanically connects synchronous motor 47, which is running at this time at a speed determined by the frequency of the timing signal supplied through amplifier 46 from source 45, to servo transmitter 52 through clutch 49. Rotation of servo transmitter 52 produces an output signal from the transmitter which is a measure of the desired speed and position of the carriage, and this signal is supplied to synchro control transformer 61 to produce across the rotor of this device a signal which is a measure of the difference between the actual speed and position of the carriage and its desired speed and position. This error signal is supplied to mixing network 65 through contacts 66c of relay 66, along with the signals from rate command generator 60 and tachometer generator 64.

The output from mixing network 65 is supplied through servo amplifier 67 to servo motor 63 which proceeds to drive the carriage through shaft 27, pulley 25 and belt 24. During the traverse of the plotter along the length of its forward travel, the servo system operates in a well-known manner, in which a measure of the desired position is compared with a measure of the actual position and the difference in this comparison is utilized to drive servo motor 63 in a manner which will reduce or eliminate the difference. As is well known in the art, the servo loop gain can be considerably increased without instability if a signal component proportional to rate of change of position of the controlled device is fed back into the input of the servo amplifier. Tachometer generator 64 supplies this rate signal, which produces a positional error proportional to velocity. This is compensated for by rate command generator 60 which produces a signal of such phase and amplitude as to cancel the tachometer output at the expected velocity.

As carriage 23 and galvanometers 21 travel on the forward sweep, the galvanometers are energized by the different signals from reproduce heads 13a . . . 13n to produce a plot of the signals on paper 31 in the manner shown. When carriage 23 reaches the end of its forward travel, limit switch 76 is actuated to close contacts 76b. This action energizes coil 72a of relay 72 to close contact 72b for sealing in coil 72a and to close contacts 72c. Closure of contacts 72c energizes coil 66a of relay 66 from battery 71 to cause opening of contacts 66c and 66d and closure of contacts 66b. Closure of contacts 66b connects reverse command generator 68 through servo amplifier 67 to servo motor 63 to reverse the rotation of servo motor 63 and drive carriage 23 in the reverse direction back to its starting point. Opening of contacts 66d removes the source of plate voltage from tube 91 to de-energize this tube and hence de-energize clutch 48. De-energization of clutch 48 disconnects synchronous motor 47 from servo transmitter 52.

Closure of contacts 72c also connects relay coil 50a to battery 71 through delay drop-out network 73 so that relay 50 is actuated to open contacts 50b to disconnect clutch 49 from battery 51. Energization of coil 50a also produces connection of contacts 50c, 50d and 50e in the position opposite to that shown in the drawing to connect the stator and rotor windings of transmitter 52 to battery 54. This operation is performed to produce exact alignment of the rotor and stator of servo transmitter 52 for the start of the next plotting operation. The application of the potential of battery 54 through the contacts of relay 50a to the rotor and stator windings of servo transmitter 52 causes the servo transmitter to act as a D.C. motor to produce the desired alignment of the stator and rotor for the start of the next plotting operation. De-energization of clutch 49 during this aligning operation removes the mechanical load of motor 47 and clutch 48 from the servo control transmitter 52 and permits it to align itself properly. After the expiration of the delay period of delay dropout network 73, during which the above aligning operation takes place, coil 50a is de-energized to close contacts 50b and to place contacts 50c, 50d and 50e in the position shown in the drawing, thus placing servo transmitter 52 and clutch 49 in condition for the start of the next plotting sweep.

At the end of the forward carriage sweep, motor 34 is energized to drive take-up reel 33 to wind the exposed section of paper 31 on which the traces have just been plotted into the take-up magazine and to position a new section of paper 31 from the film magazine in a position to be plotted upon the next traverse of the plotter carriage.

When carriage 23 returns to its original position, limit switch 77 is actuated to open contacts 77b and break the sealing-in circuit for coil 72a. Coil 72a is thus de-energized to cause opening of contacts 72b and 72c. Opening of contacts 72c de-energizes coil 66a, which in turn closes contacts 66c to reconnect mixing network 65 to synchro control transformers 61, and closes contact 66d to again supply plate voltage to tube 91. However, tube 91 does not conduct at this time in the absence of a positive pulse on grid 91b from counters 85—88. The carriage is therefore in a position to start plotting of the next group of seismic signals in the section.

Thus, it will be seen that the present invention is operative to automatically plot the plurality of seismic signals directly from an electrical or magnetic record to a photographic film and to automatically position itself after each individual plotting sweep to be in position to plot the next group of traces. Additionally, it will be seen that the device of the present invention utilizes a reference timing signal from the record as a measure by a source so that the plotting is done in the same time as that in which the signals are recorded.

We claim:

1. Apparatus for automatically plotting a seismic cross-section from a plurality of groups of reproducibly recorded seismic detector signals, each of said groups of detector signals having associated therewith a timing reference signal and a reference event, comprising a plurality of galvanometers, each galvanometer corresponding to one of the different seismic signals in one group of said plurality of groups, a carriage for supporting said galvanometers, drive means for driving said carriage and said galvanometers past a photosensitive medium, timing means responsive to the time of occurrence of said reference event on the reproducible record for controlling the start of said drive means, a servo mechanism controlled by said timing reference signal for controlling the speed of said drive means in accordance with the frequency of said timing reference signal, whereby the speed of drive of said carriage and said galvanometers is related to the timing on said reproducible record, and means for supplying one of said groups of reproducibly recorded seismic detector signals to said bank of galvanometers each time said galvanometers are driven past said photosensitive medium to record said plurality of groups of said signals as a seismic cross section on said medium.

2. Apparatus for automatically plotting a seismic cross-section from a plurality of groups of reproducibly recorded seismic detector signals, each of said groups of detector signals having associated therewith a timing reference signal and a reference event, comprising a plurality of galvanometers corresponding to the different seismic signals, a carriage for said galvanometers, drive means for driving said carriage and said galvanometers past a photosensitive medium, time-break means responsive to the time of occurrence of said reference event on the reproducible record, delay and counting means responsive to said time-break means for controlling the start of said drive means at an adjustable time after occurrence of said reference event, a servo mechanism controlled by said timing reference signal for controlling the speed of said drive means in accordance with the frequency of said timing signal, whereby the speed of drive of said galvanometers is related to the timing on said reproducible record, and means for supplying one of said groups of reproducibly recorded seismic detector signals to said galvanometers each time said galvanometers are driven past said photosensitive medium to record said signals on said medium.

3. Apparatus for automatically plotting a seismic cross-section from a plurality of groups of reproducibly recorded seismic detector signals, each of said groups of detector signals having associated therewith a variable frequency timing reference signal and a reference event, comprising a plurality of galvanometers corresponding to the different seismic signals, a carriage for said galvanometers, drive means for driving said carriage and said galvanometers past a photosensitive medium, time-break means responsive to the time of occurrence of said reference event on the reproducible record, delay and counting means responsive to said time-break means for controlling the start of said drive means at an adjustable time after occurrence of said reference event, a servo mechanism controlled by said timing reference signal for controlling the speed of said drive means in accordance with the frequency of said timing signal, whereby the speed of drive of said galvanometers is related to the timing on said reproducible record, and means for supplying one of said groups of reproducibly recorded seismic detector signals to said galvanometers each time said galvanometers are driven past said photosensitive medium to record said signals on said medium.

4. Apparatus for automatically plotting a seismic cross-section from a plurality of groups of reproducibly recorded seismic detector signals, said detector signals having associated therewith a timing reference signal and a reference event, comprising a plurality of galvanometers, each galvanometer corresponding to one of the different seismic signals in one group of said plurality of groups, a carriage for supporting said galvanometers, drive means for driving said carriage and said galvanometers past a portion of a recording medium, timing means responsive to the time of occurrence of said reference event on the reproducible record for controlling the start of said drive means, means controlled by said timing reference signal for controlling the speed of said drive means in accordance with the frequency of said timing reference signal, whereby the speed of drive of said galvanometers is related to the timing on said reproducible record, and means for supplying one of said groups of said reproducibly recorded seismic detector signals to said galvanometers as said galvanometers are driven past said portion of said recording medium to record said group of signals on said medium, and means for moving said recording medium transverse to the movement of said carriage and said galvanometers to position said galvanometers over adjacent portions of said medium.

5. Apparatus for automatically plotting a seismic cross section from a plurality of groups of reproducibly recorded seismic detector signals, comprising a bank of galvanometers, a carriage for said galvanometers, drive means for driving said carriage and said galvanometers past a portion of a sheet of photo-sensitive paper, means for generating a timing reference signal having a frequency which has a predetermined relationship to the timing of one group of said plurality of groups of said seismic signals, a servo network energized by said timing reference signal for controlling the speed of said drive means in accordance with the frequency of said timing reference signal, whereby the timing of said cross section corresponds to the timing of said reproducibly recorded signals, means for supplying said seismic detector signals to said galvanometer during movement of said galvanometers past said portion of said photosensitive paper to record said signals on said paper, means for moving said paper to bring adjacent portions thereof under said bank of galvanometers for recording separate groups of said plurality of reproducibly recorded seismic signals on said paper as adjacent portions of said seismic cross section, and means for energizing said servo network by the same timing reference signal during each recording of another group of said plurality of seismic signals to automatically synchronize all of said plurality of groups to the timing of said one group.

References Cited in the file of this patent
UNITED STATES PATENTS

| | | |
|---|---|---|
| 2,604,955 | Hawkins | July 29, 1952 |
| 2,638,402 | Lee | May 12, 1953 |
| 2,626,004 | Hasbrook | June 20, 1953 |
| 2,803,515 | Begun et al. | Aug. 20, 1957 |
| 2,837,729 | Houghton et al. | June 3, 1958 |
| 2,841,777 | Blake et al. | July 1, 1958 |